US012113289B2

(12) United States Patent
Hu

(10) Patent No.: US 12,113,289 B2
(45) Date of Patent: Oct. 8, 2024

(54) DUAL-FREQUENCY AND DUAL-POLARIZATION ANTENNA ARRAY AND ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Hsin-Nan Hu, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 173 days.

(21) Appl. No.: 17/871,027

(22) Filed: Jul. 22, 2022

(65) Prior Publication Data

US 2023/0051826 A1 Feb. 16, 2023

(30) Foreign Application Priority Data

Jul. 29, 2021 (CN) ......................... 202110866620.3

(51) Int. Cl.
*H01Q 21/24* (2006.01)
*H01Q 5/307* (2015.01)

(52) U.S. Cl.
CPC ............. *H01Q 21/24* (2013.01); *H01Q 5/307* (2015.01)

(58) Field of Classification Search
CPC .......... H01Q 21/24; H01Q 5/307; H01Q 1/38; H01Q 9/285; H01Q 21/062; H01Q 25/005; H01Q 5/10; H01Q 9/0428
See application file for complete search history.

(56) References Cited

U.S. PATENT DOCUMENTS 4,454,514 A * 6/1984 Itoh ...................... H01Q 21/245
343/700 MS
5,926,137 A * 7/1999 Nealy .................. H01Q 21/245
343/873
5,959,594 A * 9/1999 Wu ........................ H01Q 15/12
343/756

(Continued)

FOREIGN PATENT DOCUMENTS

CN 201699130 U * 1/2011
CN 109103574 A * 12/2018 ............... H01Q 1/36

(Continued)

*Primary Examiner* — Ricardo I Magallanes
*Assistant Examiner* — Jordan E. DeWitt
(74) *Attorney, Agent, or Firm* — ScienBiziP, P.C.

(57) ABSTRACT

A dual-frequency and dual-polarization antenna array for simultaneously transmitting and receiving dual-frequency signals comprises: a first substrate, an array of dual-frequency and dual-polarization antennas, each antenna in the array comprising a first polarization antenna and a second polarization antenna. The first and second polarization antennas are laid out orthogonally in the first substrate, a horizontal distance between adjacent antennas being equal to a wavelength of frequency band of each antenna, the horizontal distance between adjacent antennas is smaller than a vertical distance between adjacent antennas. An electronic device comprising the dual-frequency and dual-polarization antenna array is also provided.

14 Claims, 9 Drawing Sheets

(56) References Cited

U.S. PATENT DOCUMENTS

| | | | | |
|---|---|---|---|---|
| 7,084,830 | B1 * | 8/2006 | Suh | H01Q 9/285 343/893 |
| 8,766,743 | B2 * | 7/2014 | Mohamadi | H01Q 21/065 333/125 |
| 9,502,780 | B2 * | 11/2016 | Chau | H01Q 21/24 |
| 10,819,041 | B1 * | 10/2020 | Kee | H01Q 21/064 |
| 11,005,190 | B1 * | 5/2021 | Lin | H01Q 21/245 |
| 11,527,829 | B1 * | 12/2022 | Chiang | H01Q 21/24 |
| 11,923,611 | B2 * | 3/2024 | Hu | H01Q 1/241 |
| 2003/0103007 | A1 * | 6/2003 | Chiu | H01Q 5/357 343/702 |
| 2004/0027291 | A1 * | 2/2004 | Zhang | H01Q 15/0026 343/846 |
| 2005/0012665 | A1 * | 1/2005 | Runyon | H01Q 3/40 455/562.1 |
| 2005/0179611 | A1 * | 8/2005 | Holly | H01Q 25/02 343/820 |
| 2017/0062952 | A1 * | 3/2017 | Sundararajan | H01Q 1/246 |
| 2017/0214140 | A1 * | 7/2017 | Thill | H01Q 9/28 |
| 2018/0198191 | A1 * | 7/2018 | So | H01Q 5/40 |
| 2018/0309198 | A1 * | 10/2018 | Yu | H01Q 25/002 |
| 2019/0267710 | A1 * | 8/2019 | Jenwatanavet | H01Q 21/065 |
| 2019/0393729 | A1 * | 12/2019 | Contopanagos | H02J 50/40 |
| 2020/0052403 | A1 * | 2/2020 | Hong | H01Q 9/32 |
| 2020/0203835 | A1 * | 6/2020 | Wu | H01Q 9/27 |
| 2021/0066817 | A1 * | 3/2021 | Tehran | H01Q 21/065 |
| 2022/0013884 | A1 * | 1/2022 | Zhao | H01Q 9/0457 |
| 2022/0209398 | A1 * | 6/2022 | Chiang | H01Q 21/08 |
| 2022/0393368 | A1 * | 12/2022 | Li | H01Q 9/285 |
| 2023/0051826 | A1 * | 2/2023 | Hu | H01Q 21/24 |
| 2023/0076013 | A1 * | 3/2023 | Moallem | H01Q 21/24 |
| 2023/0208049 | A1 * | 6/2023 | Hu | H01Q 1/241 343/893 |

FOREIGN PATENT DOCUMENTS

| | | | | | |
|---|---|---|---|---|---|
| CN | 110829004 | A | * | 2/2020 | H01Q 1/38 |
| CN | 112582790 | A | * | 3/2021 | H01Q 1/38 |
| CN | 112993570 | A | * | 6/2021 | H01Q 1/12 |
| CN | 113113762 | A | * | 7/2021 | H01Q 1/246 |
| CN | 113383464 | A | * | 9/2021 | H01Q 1/241 |
| CN | 115117608 | A | * | 9/2022 | |
| WO | WO-2020237692 | A1 | * | 12/2020 | |
| WO | WO-2021212277 | A1 | * | 10/2021 | |

* cited by examiner

DUAL-FREQUENCY AND DUAL-POLARIZATION ANTENNA ARRAY AND ELECTRONIC DEVICE

TECHNICAL FIELD

The subject matter herein generally relates to wireless communication, to antennas with dual-frequency and dual-polarization.

BACKGROUND

In communication engineering, broadcast technology, radar technology, navigation technology, etc., radio wave signals can be transmitted through an antenna. The antenna is an important element of a wireless communication device, antenna technology has improved the development of science and technology.

At present, fifth-generation (5G) communication is fast, and relevant applications are also widely used. Most of 5G communication antennas are patch antennas with simple structures. An impedance bandwidth of the patch antenna is narrow, and forming a dual-polarization antenna, and a multi-array antenna is problematic.

BRIEF DESCRIPTION OF THE DRAWINGS

Implementations of the present technology will now be described, by way of example only, with reference to the attached figures.

DETAILED DESCRIPTION

In order to understand the application, features and advantages of the application, and a detailed description of the application are described through the embodiments and the drawings. It should be noted that, the embodiments of the application and the features in the embodiments can be combined with each other.

Many details are described in the following descriptions, but the embodiments described are only part of the embodiments of the application, not the entirety of embodiments.

Unless defined otherwise, all technical or scientific terms used herein have the same meaning as those normally understood by technicians in the technical field. The following technical terms are used to describe the application, the description is not to be considered as limiting the scope of the embodiments herein.

Figure 1:
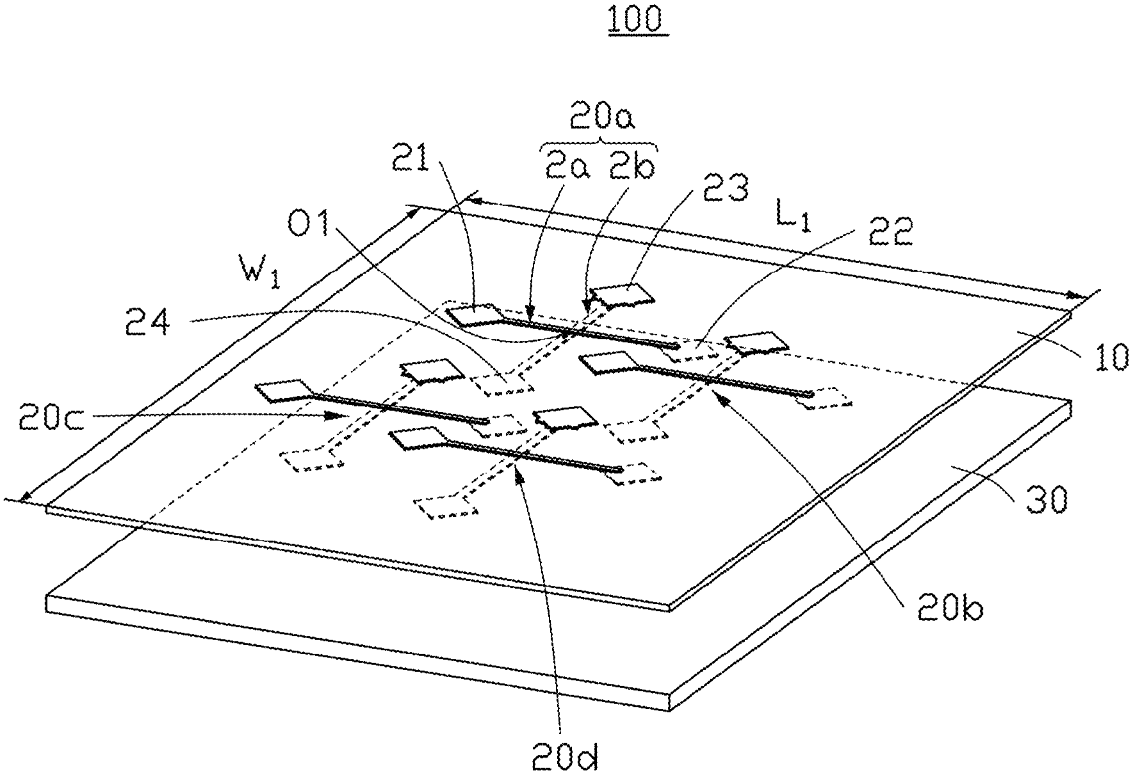
FIG. 1 is a structure diagram of an embodiment of a dual-frequency and dual-polarization antenna array according to the present disclosure.

FIG. 1 illustrates a dual-frequency and dual-polarization antenna array 100 of the present application.

The dual-frequency and dual-polarization antenna array 100 comprises a first substrate 10, N*M dual-frequency and dual-polarization antennas, and a second substrate 30. N and M are positive integers. In FIGS. 1, N and M are equal to 2 for example, and the N*M dual-frequency and dual-polarization antennas comprise dual-frequency and dual-polarization antennas 20*a*, 20*b*, 20*c*, and 20*d*.

Each of the dual-frequency and dual-polarization antennas 20*a*, 20*b*, 20*c*, and 20*d* can comprise a first polarization antenna 2*a* and a second polarization antenna 2*b*. The first polarization antenna 2*a* can comprise a first radiation portion 21 and a second radiation portion 22. The first radiation portion 21 is disposed on a first surface of the first substrate 10, and the second radiation portion 22 is disposed on a second surface of the first substrate 10. The second polarization antenna 2*b* can comprise a third radiation portion 23 and a fourth radiation portion 24. The third radiation portion 23 is disposed on the first surface of the first substrate 10, and the fourth radiation portion 24 is disposed on the second surface of the first substrate 10.

The second substrate 30 is located in a side of the second surface of the first substrate 10, and a surface of the second substrate 30 close to the first substrate 10 is copper-clad. In layout, the first polarization antenna 2*a* and the second polarization antenna 2*b* are orthogonal to each other in the first substrate 10. The dual-frequency and dual-polarization antennas 20*a*, 20*b*, 20*c*, and 20*d* have the same operating frequency band. For example, in an application scenario of 5G communication, the operating frequency bands of the dual-frequency and dual-polarization antennas 20*a*, 20*b*, 20*c*, and 20*d* can comprise 28 GHz and 38 GHz frequency bands.

In one embodiment, a distance between two adjacent dual-frequency and dual-polarization antennas 20*a* and 20*b* in a horizontal direction is equal to a wavelength 1 of the operating frequency band. For example, the wavelength k of the 28 GHz frequency band in air is 10.5 mm, and the distance between the two adjacent dual-frequency and dual-polarization antennas 20*a* and 20*b* in the horizontal direction can be set as 10.5 mm.

In one embodiment, the distance between the two adjacent dual-frequency and dual-polarization antennas 20*a* and 20*b* in the horizontal direction is less than a distance between two adjacent dual-frequency and dual-polarization antennas 20*a* and 20*c* in a vertical direction. For example, the vertical distance between the two adjacent dual-frequency and dual-polarization antennas 20*a* and 20*c* can be set as 13 mm.

In one embodiment, the horizontal direction and the vertical direction can be defined as a predetermined rule, for example, the horizontal direction and the vertical direction can be defined based on the current orientation of the first substrate 10.

In FIG. 1, the first polarization antenna 2*a* and the second polarization antenna 2*b* are orthogonal to each other to form an orthogonal point 01, and the distance between the two adjacent dual-frequency and dual-polarization antennas is a distance between orthogonal points 01 of the two adjacent dual-frequency and dual-polarization antennas. For example, the horizontal distance between the two adjacent dual-frequency and dual-polarization antennas 20*a* and 20*b* is a first distance D1, and the vertical distance between the two adjacent dual-frequency and dual-polarization antennas 20*a* and 20*c* is a second distance D2.

In one embodiment, a layout direction of the first polarization antenna 2*a* is the horizontal direction, a layout direction of the second polarization antenna 2*b* is the vertical direction. The first polarization antenna 2*a* and the second polarization antenna 2*b* are orthogonally arranged 90 degrees apart, so that each of the dual-frequency and dual-polarization antennas 20*a*, 20*b*, 20*c*, and 20*d* operate both vertically and horizontally at the same time, reducing the number of antennas and loss in feed while matching antenna isolation requirement. Each of the dual-frequency and dual-polarization antennas 20*a*, 20*b*, 20*c*, and 20*d* can simultaneously perform a dual working mode of signal transmitting and signal receiving. The surface of the second substrate 30 close to the first substrate 10 is a copper-clad surface, the second substrate 30 can work as a reflecting board, increasing broadside antenna gain.

In one embodiment, the second substrate 30 can be grounded as a barrier between the dual-frequency and dual-polarization antenna array 100 and other circuit elements (for example a transmitter or a transceiver), to shield and restrict the dual-frequency and dual-polarization antenna array 100 against noise.

In one embodiment, there can be an extended arrangement of the dual-frequency and dual-polarization antenna array 100, and the dual-frequency and dual-polarization antenna array 100 can be expanded to 4*4 or more. The dual-frequency and dual-polarization antennas do not affect impedance matching with each other, and each dual-frequency and dual-polarization antenna is well isolated between the horizontally polarized antenna (for example first polarization antenna 2*a*) and the vertically polarized antenna (for example second polarization antenna 2*b*).

In one embodiment, a material of the first substrate 10 can be Roges R04003C, a dielectric constant of the first substrate 10 can be 3.55, and a dielectric loss of the first substrate 10 can be 0.0027. A length (L1) and a width (W1) of the first substrate 10 can be 80 mm*80 mm, and a thickness of the first substrate 10 can be 0.5 mm. A material of the second substrate 30 can be FR-4 epoxy glass cloth, a dielectric constant of the second substrate 30 may be 4.4, and a dielectric loss of the second substrate 30 may be 0.02. A length and a width of the second substrate 30 may be 80 mm*80 mm, and a thickness of the second substrate 30 may be 0.8 mm.

In one embodiment, the length, the width, and the thickness of the first substrate 10 or the second substrate 30 can also be set to other dimensions according to an actual application need.

In one embodiment, each of the dual-frequency and dual-polarization antennas 20*a*, 20*b*, 20*c*, and 20*d* can further comprise two signal feeding lines to provide current signals. The signal feeding lines can be radio frequency (RF) coaxial cable or other type of cable.

Figure 2:
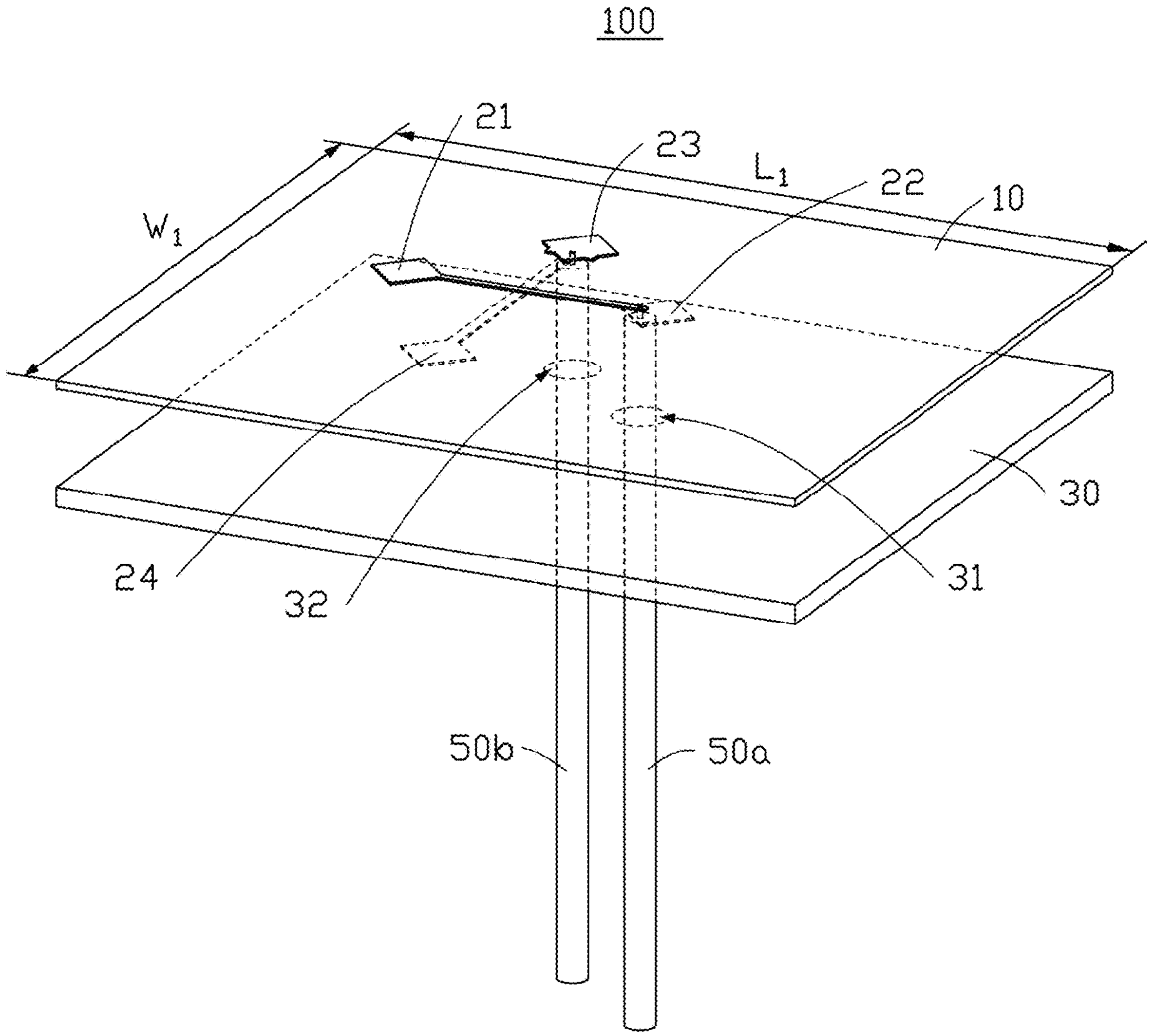
FIG. 2 is a structure diagram of an embodiment of a dual-frequency and dual-polarization antenna of the dual-frequency and dual-polarization antenna array of FIG. 1.

Referring to FIG. 2, the dual-frequency and dual-polarization antenna 20*a* is taken as an example for description, the dual-frequency and dual-polarization antenna 20*a* comprise a first signal feeding line 50*a* and a second signal feeding line 50*b*. The first signal feeding line 50*a* is coupled (electrically connected) to the second radiation portion 22, and the second signal feeding line 50*b* is coupled to the fourth radiation portion 24. For example, the first signal feeding line 50*a* and the second signal feeding line 50*b* can be coupled to the dual-frequency and dual-polarization antenna 20*a* directly from below.

In one embodiment, the second substrate 30 comprises a first through hole 31 and a second through hole 32, the first signal feeding line 50*a* can pass through the first through hole 31, and the second signal feeding line 50*b* can pass through the second through hole 32. Then, the first signal feeding line 50*a* and the second signal feeding line 50*b* pass through the second substrate 30 through the first through hole 31 and the second through hole 32, to reduce feed loss. The first signal feeding line 50*a* and the second signal feeding line 50*b* can be RF microwave coaxial cables.

In one embodiment, structures of the dual-frequency and dual-polarization antennas 20*b*, 20*c*, and 20*d* are the same as that of the dual-frequency and dual-polarization antennas 20*a*, and structural descriptions of the dual-frequency and dual-polarization antennas 20*b*, 20*c*, and 20*d* are omitted here.

The second substrate 30 can also be configured as a circuit board of other elements (for example transmitters and phase shifters), for reducing loss when feeding current signals to the dual-frequency and dual-polarization antenna array 100.

Figure 3:
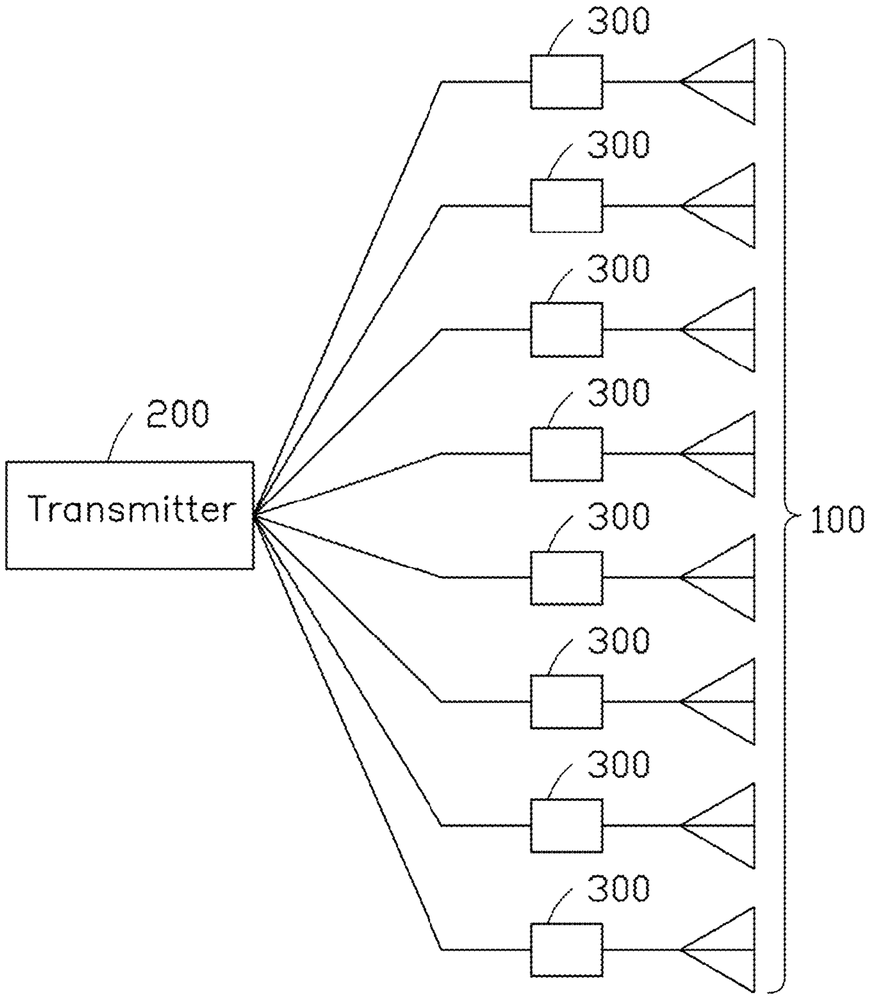
FIG. 3 is a diagram of phase angle adjustments of feed signals of the dual-frequency and dual-polarization antenna array of FIG. 1.

Referring to FIG. 3, the dual-frequency and dual-polarization antenna array 100 is a 2*2 antenna array as an example, the dual-frequency and dual-polarization antenna array 100 comprises eight polarization antennas, and a transmitter 200 can feed current signals of different phases into the eight polarization antennas through a plurality of phase shifters 300. By changing phase angles of current feeding to the polarized antennas, a wide range of main lobe beam scanning angles can be achieved.

For example, the phase angles of the current output by the transmitter 200 are changed by the phase shifter 300, so that the current signals feeding into each polarization antenna has a predetermined phase angle difference. The predetermined phase angle difference can be set according to an actual application need. For example, the predetermined phase angle difference is 15 degrees. The eight polarization antennas comprise eight feed sources, and each feed source differs by 15 degrees. For example, phase angles of the eight polarization antennas can be set to 0°, 15°, 30°, 45°, 60°, 75°, 90°, and 105°. If the dual-frequency and dual-polarization antenna array 100 is expanded to 16*16 or higher antenna array, the phase angle difference can be adjusted according to the actual application need.

In one embodiment, the phase shifter 300 can be controlled by a predetermined control element (for example a microcontroller), and a superposition of phase-shifted signals causes a variable direction of radio beam to achieve a wide range of main lobe beam scanning angles.

Figure 4A:
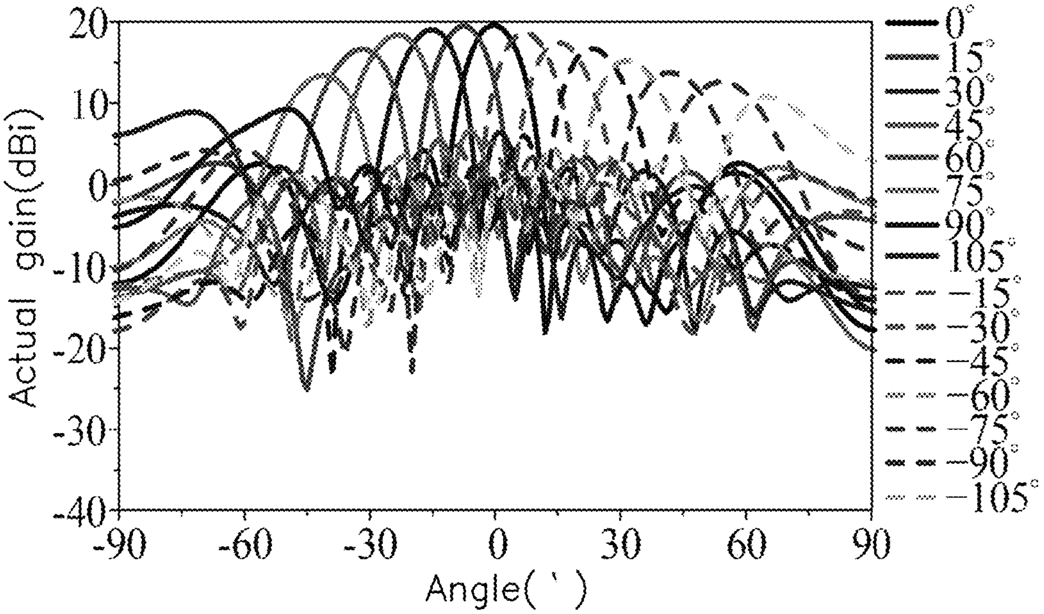
FIGS. 4A and 4B are diagrams of scanning angle ranges of main lobe beams in different frequency bands of the dual-frequency and dual-polarization antenna array of FIG. 1.
Figure 4B:
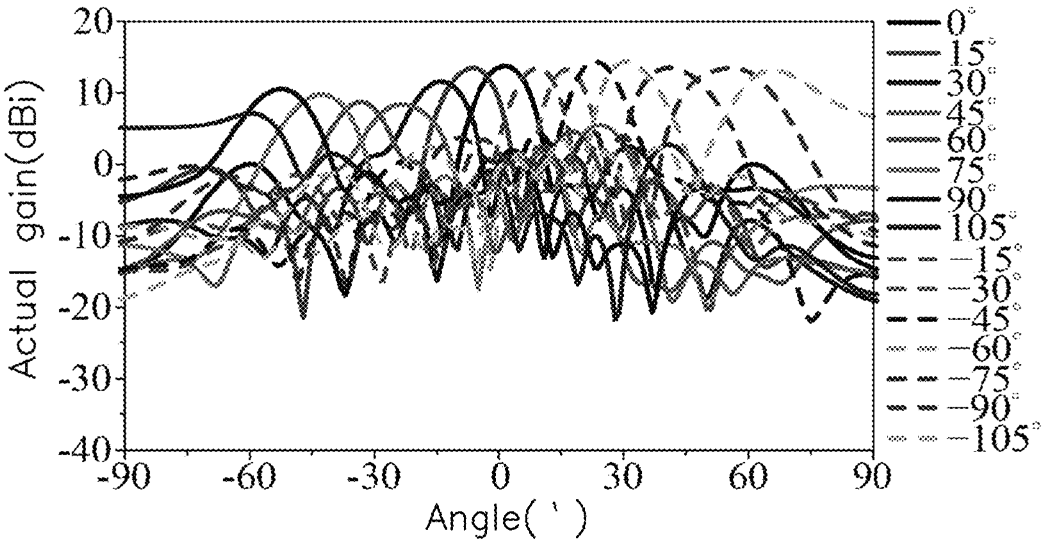

FIG. 4A shows a scanning angle range of main lobe beam in the 28 GHz application scenario of the dual-frequency and dual-polarization antenna array 100. FIG. 4B shows another scanning angle range of main lobe beam in the 38 GHz application scenario of the dual-frequency and dual-polarization antenna array 100.

In one embodiment, a phase angle difference of feed sources between the same polarization antenna can be set as 15 degrees, or a phase angle difference of feed sources between the same dual-frequency and dual-polarization antenna can be set as 15 degrees.

Figure 5:
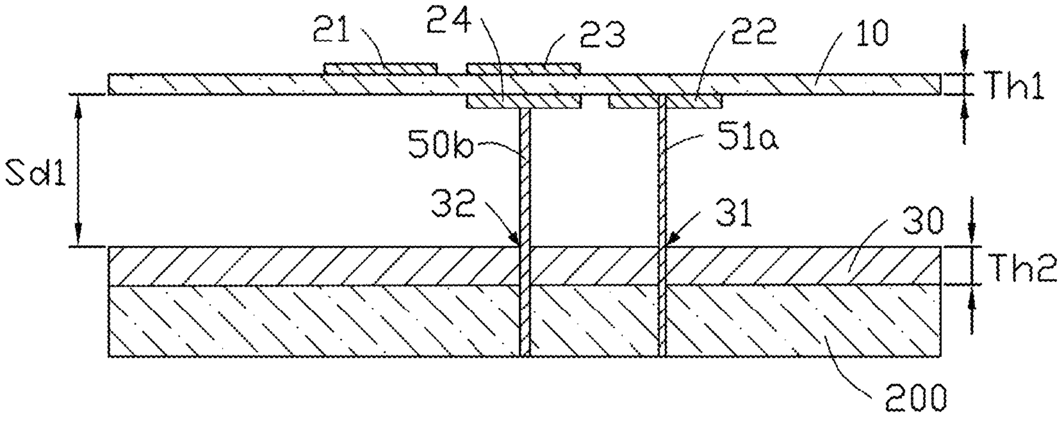
FIG. 5 is a section view of an embodiment of a dual-frequency and dual-polarization antenna of the dual-frequency and dual-polarization antenna array of FIG. 1.
Figure 6:
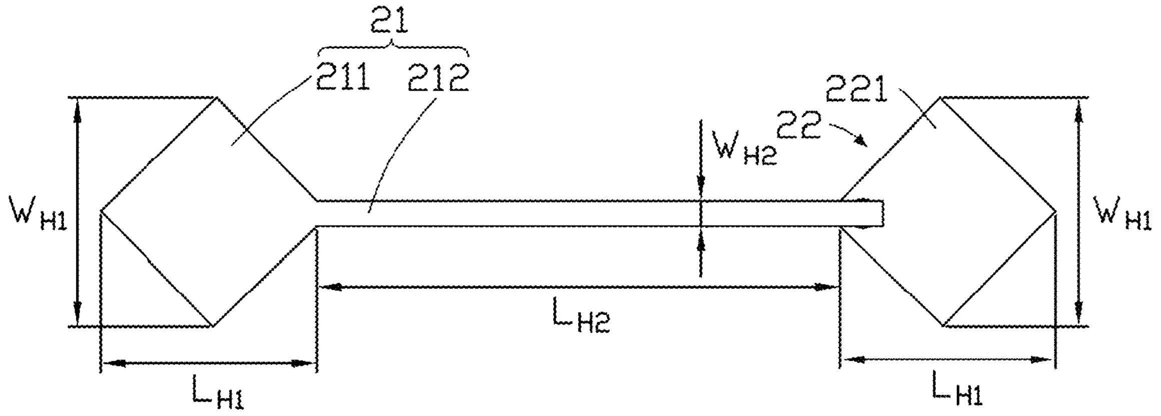
FIG. 6 is a structure diagram of a first polarization antenna of the dual-frequency and dual-polarization antenna of FIG. 2.
Figure 7:
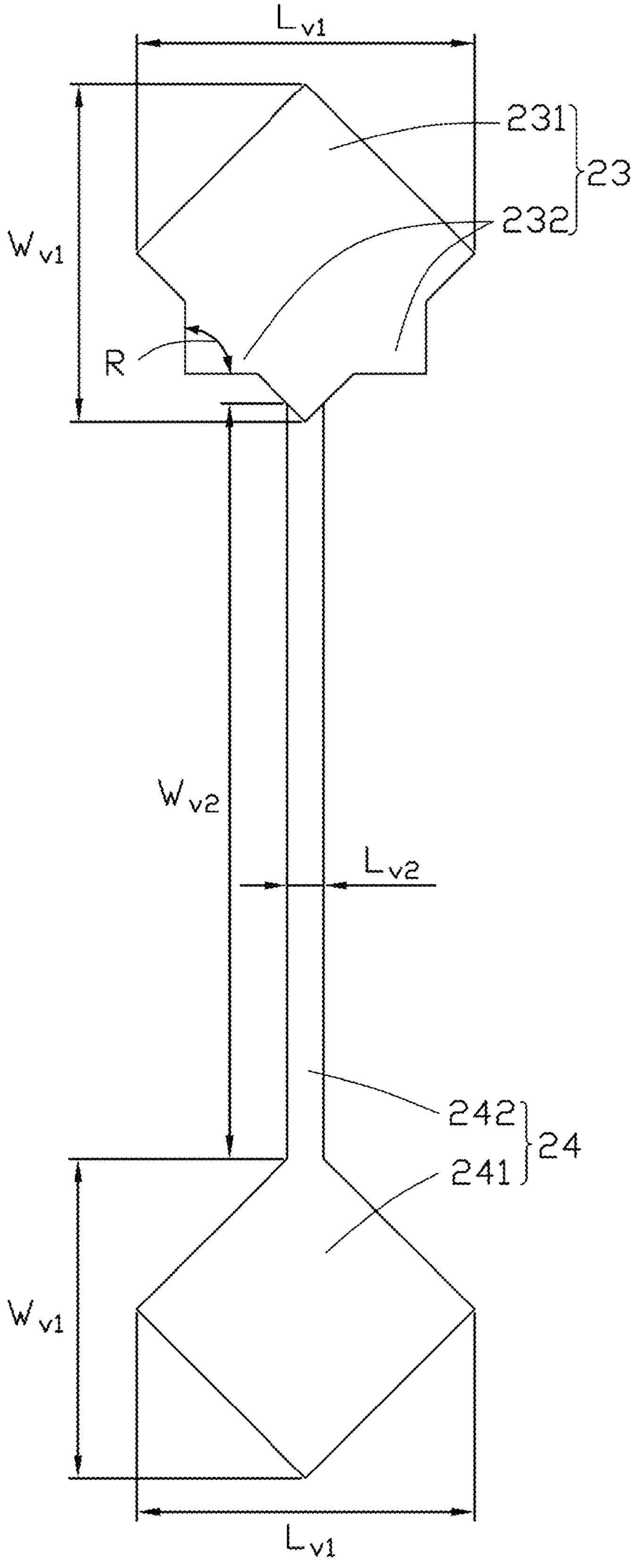
FIG. 7 is a structure diagram of a second polarization antenna of the dual-frequency and dual-polarization antenna of FIG. 2.

Referring to FIGS. 5-7, the transmitter 200 can be disposed on the second substrate 40, the current outputted by the transmitter 200 can be fed to the second radiation portion 22 and the fourth radiation portion 24 through the first signal feeding line 50*a* and second signal feeding line 50*b*. For example, the transmitter 200 can be disposed on a surface of the second substrate 40 away from the first substrate 10.

In one embodiment, the first radiation portion 21 can comprise a first square portion 211 and a first rectangular portion 212. The first rectangular portion 212 is extended from a corner of the first square portion 211. The second radiation portion 22 comprises a second square portion 221.

In one embodiment, the third radiation portion 23 comprises a third square portion 231, and the fourth radiation portion 24 comprises a fourth square portion 241 and a second rectangular portion 242. The second rectangular portion 242 is extended from a corner of the fourth square portion 241. Sizes of the first square portion 211, the second square portion 221, the third square portion 231, and the fourth square portion 241 may be the same, all having a diagonal length of 5 mm. Sizes of the first rectangular portion 212 and the second rectangular portion 242 may be the same, and both have a length of 7 mm and a width of 0.7 mm.

In one embodiment, the third radiation portion 23 further comprises a convex portion 232, and the convex portion 232 is disposed on a side of the third radiation portion 23 close to the fourth radiation portion 24. In this embodiment, the third radiation portion 23 can comprise two convex portions 232, and the two convex portions 232 are respectively disposed on a middle portion of two sides of the third radiation portion 23 close to the fourth radiation portion 24. By arranging the convex portion 232, a path of current passing through the third radiation portion 23 is changed, and a bandwidth excited by the second polarization antenna 2*b* can be adjusted.

In one embodiment, the convex portion 232 is an isosceles right triangle, a long side of the convex portion 232 is attached to a side of the third radiation portion 23, and a length of the long side of the convex portion 232 is less than a side length of the third radiation portion 23. In this embodiment, two convex portions 232 are included, lengths of short sides of the convex portion 232 are 1 mm, and the two convex portions 232 are respectively disposed on the middle portions of two sides of the third radiation portion 23 close to the fourth radiation portion 24.

In one embodiment, the thickness Th1 of the first substrate 10 may be 0.5 mm, and the thickness Th2 of the second substrate 30 may be 0.8 mm. A distance Sd1 between the first substrate 10 and the second substrate 30 is equal to a quarter of the wavelength of the operating frequency band of the dual-frequency and dual-polarization antennas 20*a*. For a 5G band wireless signal of 28 GHz, a wavelength of the 5G band wireless signal in air is about 10.5 mm, the distance between the first substrate 10 and the second substrate 30 can be defined as 2.6 mm, and the distance between the first substrate 10 and the second substrate 30 is equal to a quarter of the wavelength. Then, a phase angle of reflected wave of antenna can be the same to converge the waves, and a radio beam of the converged waves can be radiated very broadly.

Referring to FIGS. 6 and 7, a size specification of the dual-frequency and dual-polarization antenna 20*a* is shown in the following Table 1 (units: mm).

TABLE 1

| $W_{H1}$ | $L_{H1}$ | $L_{H2}$ | $W_{H2}$ | $W_{v1}$ |
|---|---|---|---|---|
| 5 | 5 | 7 | 0.7 | 6 |
| $L_{v1}$ | $L_{v2}$ | $W_{v2}$ | R | $L_1$ |
| 6 | 0.7 | 7 | 90° | 25 |
| $W_1$ | $D_{a1}$ | $D_{a2}$ | $D_{a3}$ | $L_{c1}$ |
| 23 | 2.5 | 0.5 | 0.8 | 30 |

Figure 8:
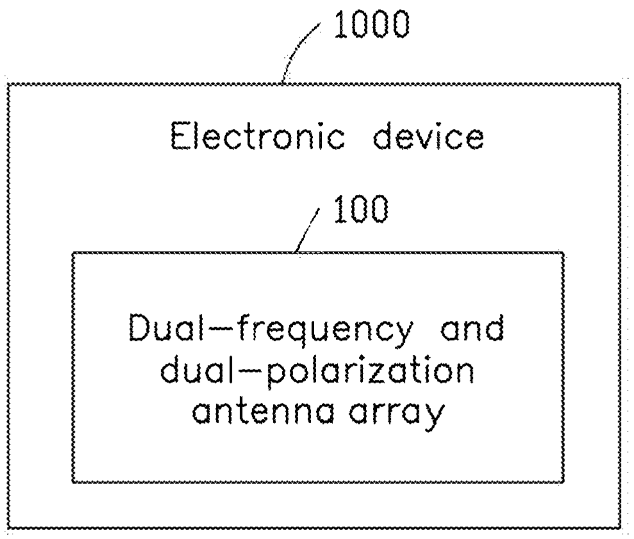
FIG. 8 is a diagram of an embodiment of an electronic device according to the present disclosure.

FIG. 8 illustrates an electronic device 1000 of the present application. The electronic device 1000 comprises the dual-frequency and dual-polarization antenna array 100 as described above. The electronic device 1000 can be a signal base station, a mobile device, a smart device, etc.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A dual-frequency and dual-polarization antenna array comprising:
- a first substrate;
- N*M dual-frequency and dual-polarization antennas, wherein N and M are positive integers, and each of the N*M dual-frequency and dual-polarization antennas comprising:
  - a first polarization antenna comprising a first radiation portion and a second radiation portion, wherein the first radiation portion is disposed on a first surface of the first substrate, and the second radiation portion is disposed on a second surface of the first substrate; and
  - a second polarization antenna comprising a third radiation portion and a fourth radiation portion, wherein the third radiation portion is disposed on the first surface of the first substrate, and the fourth radiation portion is disposed on the second surface of the first substrate; and
  - a second substrate located on a side of the second surface of the first substrate, wherein a surface of the second substrate close to the first substrate is a copper-clad surface;
- wherein layout directions of the first polarization antenna and the second polarization antenna are orthogonal in the first substrate; and a distance between two adjacent dual-frequency and dual-polarization antennas in a horizontal direction is equal to a wavelength of an operating frequency band of each of the two adjacent dual-frequency and dual-polarization antennas, and the distance between the two adjacent dual-frequency and dual-polarization antennas in the horizontal direction is smaller than a distance between two adjacent dual-frequency and dual-polarization antennas in a vertical direction, each of the N*M dual-frequency and dual-polarization antennas further comprises two signal feeding lines, the two signal feeding lines are respectively coupled to the second radiation portion and the fourth radiation portion to feed current signals, the current signals feeding the second radiation portion and the fourth radiation portion comprise a phase angle difference; and the first radiation portion comprises a first square portion and a first rectangular portion extended from a corner of the first square portion, the second radiation portion comprises a second square portion, the third radiation portion comprises a third square portion and a convex portion, the convex portion is disposed on a side of the third radiation portion close to the fourth radiation portion, and the fourth radiation portion comprises a fourth square portion and a second rectangular portion extended from a corner of the fourth square portion.

2. The dual-frequency and dual-polarization antenna array of claim 1, wherein the distance between the two adjacent dual-frequency and dual-polarization antennas in the horizontal direction is 10.5 mm, and the distance between the two adjacent dual-frequency and dual-polarization antennas in the vertical direction is 13 mm.

3. The dual-frequency and dual-polarization antenna array of claim 1, wherein the first polarization antenna and the second polarization antenna are orthogonal to each other to form an orthogonal point, and the distance between the two adjacent dual-frequency and dual-polarization antennas is a distance between orthogonal points of the two adjacent dual-frequency and dual-polarization antennas.

4. The dual-frequency and dual-polarization antenna array of claim 1, wherein the second substrate comprises two through holes, the two signal feeding lines pass through the two through holes and are respectively coupled to the second radiation portion and the fourth radiation portion to feed the current signals.

5. The dual-frequency and dual-polarization antenna array of claim 1, wherein the phase angle difference is 15 degrees.

6. The dual-frequency and dual-polarization antenna array of claim 1, wherein a side of the convex portion is attached to a side of the third radiation portion, and a length of the side of the convex portion is less than a length of the side of the third radiation portion.

7. The dual-frequency and dual-polarization antenna array of claim 1, wherein a distance between the first substrate and the second substrate is equal to a quarter wavelength of the operating frequency band.

8. An electronic device comprising a dual-frequency and dual-polarization antenna array to transmit and receive signals, wherein the dual-frequency and dual-polarization antenna array comprises:

a first substrate;

N*M dual-frequency and dual-polarization antennas, wherein N and M are positive integers, and each of the N*M dual-frequency and dual-polarization antennas comprising:

a first polarization antenna comprising a first radiation portion and a second radiation portion, wherein the first radiation portion is disposed on a first surface of the first substrate, and the second radiation portion is disposed on a second surface of the first substrate; and a second polarization antenna comprising a third radiation portion and a fourth radiation portion, wherein the third radiation portion is disposed on the first surface of the first substrate, and the fourth radiation portion is disposed on the second surface of the first substrate; and a second substrate located on a side of the second surface of the first substrate, wherein a surface of the second substrate close to the first substrate is a copper-clad surface;

wherein layout directions of the first polarization antenna and the second polarization antenna are orthogonal in the first substrate; and a distance between two adjacent dual-frequency and dual-polarization antennas in a horizontal direction is equal to a wavelength of an operating frequency band of each of the two adjacent dual-frequency and dual-polarization antennas, and the distance between the two adjacent dual-frequency and dual-polarization antennas in the horizontal direction is smaller than a distance between two adjacent dual-frequency and dual-polarization antennas in a vertical direction, each of the N*M dual-frequency and dual-polarization antennas further comprises two signal feeding lines, the two signal feeding lines are respectively coupled to the second radiation portion and the fourth radiation portion to feed current signals, the current signals feeding the second radiation portion and the fourth radiation portion comprise a phase angle difference; and the first radiation portion comprises a first square portion and a first rectangular portion extended from a corner of the first square portion, the second radiation portion comprises a second square portion, the third radiation portion comprises a third square portion and a convex portion, the convex portion is disposed on a side of the third radiation portion close to the fourth radiation portion, and the fourth radiation portion comprises a fourth square portion and a second rectangular portion extended from a corner of the fourth square portion.

9. The electronic device of claim 8, wherein the distance between the two adjacent dual-frequency and dual-polarization antennas in the horizontal direction is 10.5 mm, and the distance between the two adjacent dual-frequency and dual-polarization antennas in the vertical direction is 13 mm.

10. The electronic device of claim 8, wherein the first polarization antenna and the second polarization antenna are orthogonal to each other to form an orthogonal point, and the distance between the two adjacent dual-frequency and dual-polarization antennas is a distance between orthogonal points of the two adjacent dual-frequency and dual-polarization antennas.

11. The electronic device of claim 8, wherein the second substrate comprises two through holes, the two signal feeding lines pass through the two through holes and are respectively coupled to the second radiation portion and the fourth radiation portion to feed the current signals.

12. The electronic device of claim 8, wherein the phase angle difference is 15 degrees.

13. The electronic device of claim 8, wherein a side of the convex portion is attached to a side of the third radiation portion, and a length of the side of the convex portion is less than a length of the side of the third radiation portion.

14. The electronic device of claim 8, wherein a distance between the first substrate and the second substrate is equal to a quarter wavelength of the operating frequency band.

* * * * *